United States Patent

Dejmek et al.

Patent Number: 5,239,698
Date of Patent: Aug. 24, 1993

[54] LINEAR WEIGHTING METHOD AND DEVICE FOR DIVERSITY RECEPTION

[75] Inventors: James Dejmek, Lombard; Michael K. Alwine, Palatine, both of Ill.

[73] Assignee: Motorola, Inc., Schaumburg, Ill.

[21] Appl. No.: 590,210

[22] Filed: Sep. 28, 1990

[51] Int. Cl.$^5$ .................................. H04B 17/00
[52] U.S. Cl. ................................ 455/136; 455/137; 455/273
[58] Field of Search ............... 455/136, 137, 138, 141, 455/273

[56] References Cited

U.S. PATENT DOCUMENTS

| | | | |
|---|---|---|---|
| 4,210,871 | 7/1980 | Hill et al. | 455/273 |
| 4,450,585 | 5/1984 | Bell | 455/173 |
| 4,531,235 | 7/1985 | Brusen | 455/273 |

Primary Examiner—Reinhard J. Eisenzopf
Assistant Examiner—Timothy H. Keough
Attorney, Agent, or Firm—Darleen J. Stockley

[57] ABSTRACT

A method and device are set forth for providing improved diversity reception to a receiver system in a communication system, the receiver system having at least one receiver on each of at least a first and a second receiver branch. The method and device provide, upon receipt of signals on the receiver branches, for utilizing received signal strength voltages to determine control voltage values, utilizing the control voltage values to amplify the designated signal (the designated signal being, for example, a signal having a received signal strength (RSSI) greater than a predetermined threshold) to obtain an amplified designated signal, and generating a resultant signal in view of the at least first amplified designated signal. The control voltage values are utilized to obtain at least one weighted difference. The at least one weighted difference is utilized to obtain an adjusted amplification of the at least one designated signal in accordance with a linear approximation. Amplified designated signals are combined to obtain the resultant signal.

25 Claims, 2 Drawing Sheets

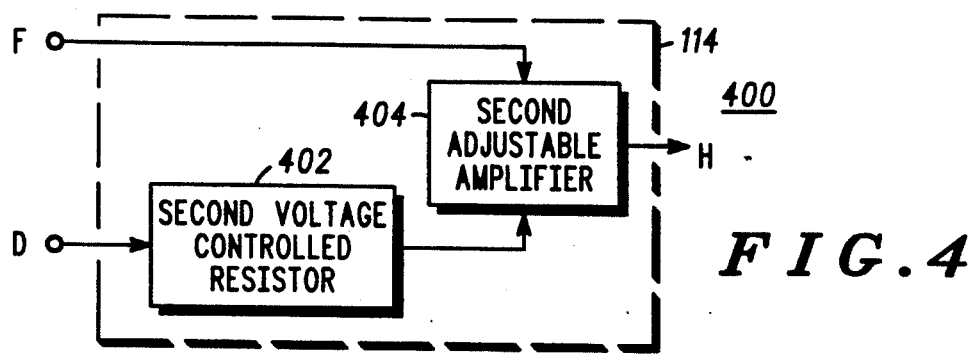
FIG.4
FIG.5
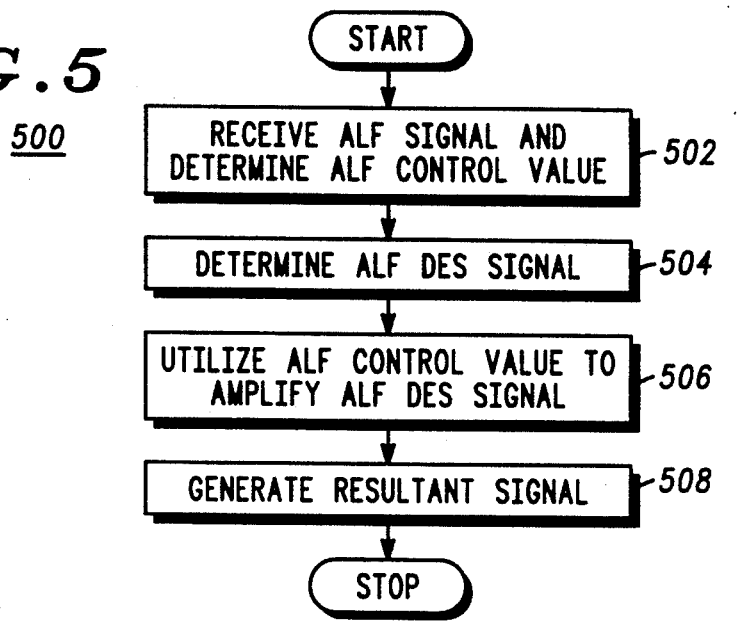
FIG.6
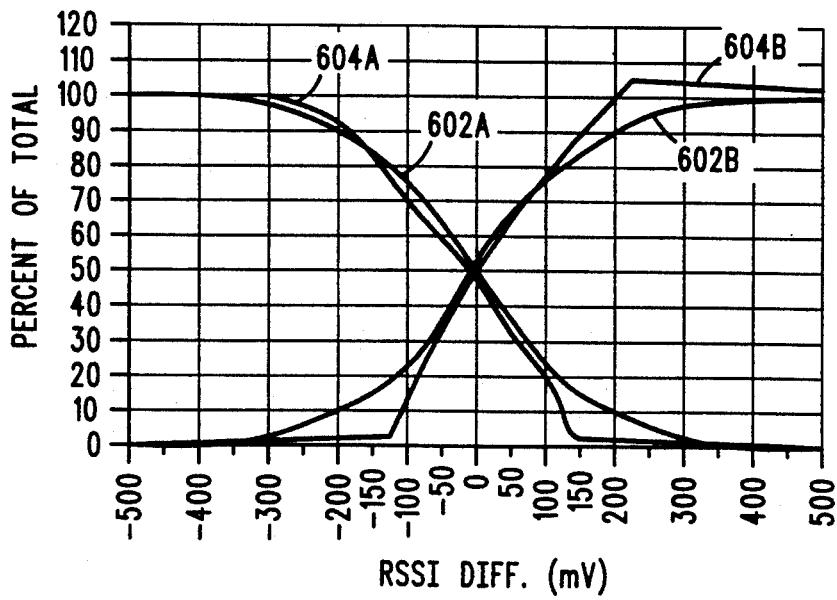

LINEAR WEIGHTING METHOD AND DEVICE FOR DIVERSITY RECEPTION

FIELD OF THE INVENTION

This invention relates in general to communication system reception, and more particularly to diversity reception in communication systems.

BACKGROUND OF THE INVENTION

To overcome the effects of fading, diversity reception was developed. In receiver selection diversity reception at least two antennas are placed a desired distance apart, and a receiver detecting a greater signal strength generally biases any other receivers off. Current maximal ratio combining diversity reception offers improved performance over receiver selection, but is difficult to implement.

There is a need for a reception system that provides improved performance over receiver selection and utilizes a less complex implementation in a post detection diversity receiving system.

SUMMARY OF THE INVENTION

The present invention sets forth a device and method of providing improved diversity reception to a receiver system in a communication system, the receiver system having at least one receiver on each of at least first and second receiver branches, comprising steps of receiving at least a first signal, being a first received signal, on at least a first receiver branch and determining at least a first control voltage value for the at least first received signal, determining, where selected, at least a first designated signal from the at least first received signal, utilizing the at least first control voltage value for the at least first received signal to amplify the at least first designated signal, thereby obtaining at least a first amplified designated signal, and generating a resultant signal in view of the at least first amplified designated signal.

Thus, at least one first control voltage value is utilized to adjustably amplify at least one first designated signal, generally there being at least two control voltage values and at least two designated signals, in accordance with a linear approximation. Amplified designated signals are combined, generally by summing, to obtain the resultant signal.

BRIEF DESCRIPTION OF THE DRAWINGS

FIG. 4 is a block diagram illustrating one embodiment of a second linear approximator of the present invention.

FIG. 5 is a flow diagram illustrating the steps of one embodiment of the method of the present invention.

FIG. 6 illustrates a plot of theoretical and actual measurements of received signal strength indication (RSSI) in millivolts versus a percent of total output resultant signal voltage.

DETAILED DESCRIPTION OF A PREFERRED EMBODIMENT

Figure 1:
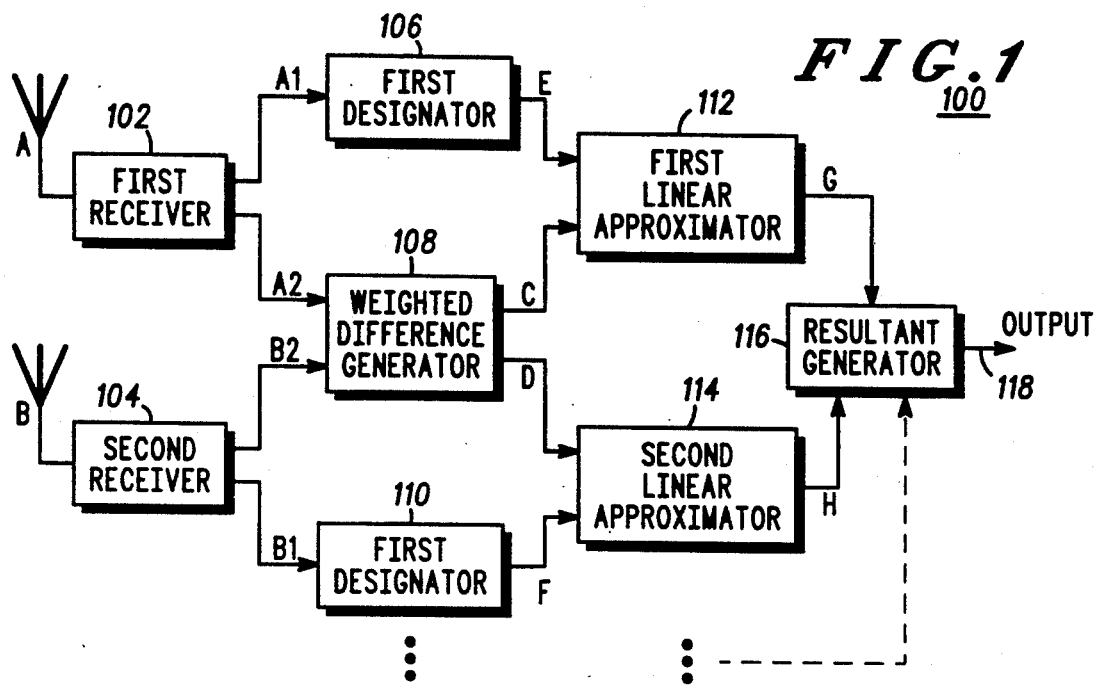
FIG. 1 is a block diagram illustrating one embodiment of hardware of the present invention.

FIG. 1, numeral 100, sets forth one embodiment of hardware of the present invention, illustrating that a weighted difference generator is utilized to determine control voltage values in view of the received signal strength voltages, which at least first control voltage is utilized to adjust amplification of at least one designated signal, and that any desired amplified designated signals are combined to generate a resultant signal.

At least one receiver (102, 104, ...) on each of at least two receiver branches receives a signal (A, B, ...). The at least one receiver derives at least one baseband information signal (A1, B1, ...). The at least first signal strength is detected and translated into a voltage (A2, B2, ...) in the weighted difference generator (108). The at least one receiver derives at least one baseband information signal (A1, B1, ...). At least one designator (106, 110, ...) is utilized to designate at least one signal (E, F, ...) within each received signal, for example, a signal having a signal strength greater than a predetermined threshold.

Figure 2:
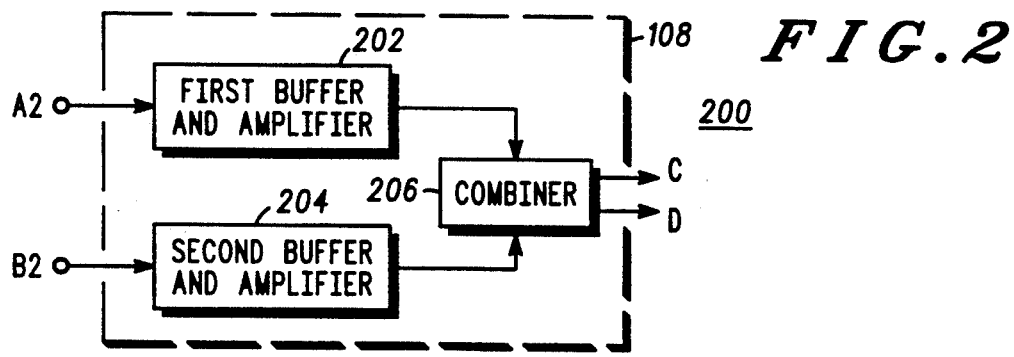
FIG. 2 is a block diagram illustrating one embodiment of a weighted difference generator of the present invention.

FIG. 2, numeral 200, illustrates a weighted difference generator (108) that determines at least a first received signal strength as a voltage, and, in one implementation, utilizes a first buffer and amplifier (202) to adjust the at least first received signal voltage (A2). Similarly, if desired, the weighted difference generator (108) determines a second received signal strength as a voltage (B2), and, if desired, utilizes a second buffer and amplifier (204) to adjust the second received signal voltage (B2). A combiner (206) combines the adjusted at least first received signal voltage (A2) and other desired adjusted received signal voltages, weighting output differences in accordance with input differences before buffering and amplification, so as to provide the weighted difference output voltages (C, D, ...), i.e., the control voltages. Typically the buffers, amplifiers, and combiner of the weighted difference generator comprise at least one operational amplifier and a desired number of predetermined resistors arranged so as to provide desired weighted difference output voltages (C, D) relative to a predetermined reference voltage. A predetermined reference voltage is generally selected such that the weighted difference output voltages (C, D), i.e., the control voltages, are positive.

FIG. 6, numeral 600, illustrates a plot of two received signals, a theoretical weighting factor, Y, is determined as follows:

$$Y = \frac{10^{\textit{diff}(dB)/10}}{10^{\textit{diff}(dB)/10} + 1},$$

where, for a difference of 0.00 millivolts RSSI, a difference of 0.00 dB is defined, and weighting of both signals is set to 50.00 percent. It is seen that weighted differences between the RSSI's of received signals (604A, 604B) closely fit the theoretical curves (602A, 602B).

Figure 3:
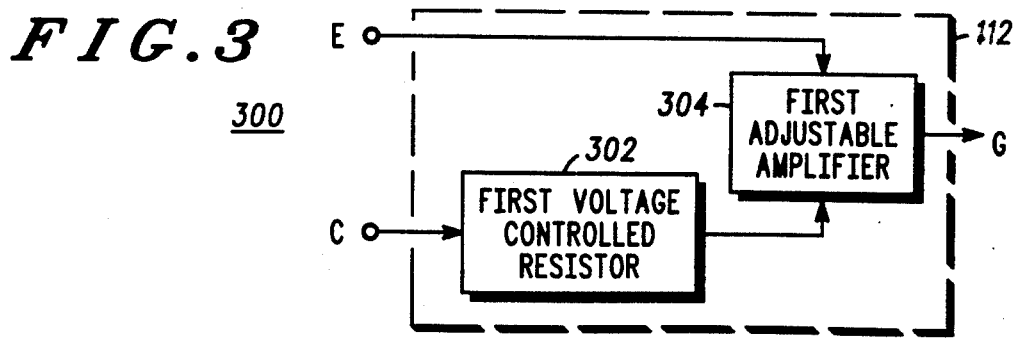
FIG. 3 is a block diagram illustrating one embodiment of a first linear approximator of the present invention.

FIGS. 3 and 4 illustrate an at least first linear approximator (112) and a second linear approximator (114), utilized in the present invention. Generally at least two linear approximators are used (one per receiver branch).

Typically, a first voltage-controlled resistor (302) is operably connected to the weighted difference generator (108). A designated signal from the at least first designator (106) and a voltage controlled resistance from the first voltage-controlled resistor (302) are applied to a first adjustable amplifier (304).

A desired metal-oxide semiconductor is generally utilized as the voltage-controlled resistor (302). Typically, the first adjustable amplifier is at least one predetermined operational amplifier and a desired number of predetermined resistors, selected to provide a first desired amplified output signal.

Generally at least two linear approximators are used. As described above and further set forth in FIG. 4, a second voltage-controlled resistor (402) is operably connected to the weighted difference generator (108). A designated signal from a second designator (110) and a voltage controlled resistance from the second voltage-controlled resistor (402) are applied to a second adjustable amplified (404). A desired metal-oxide semiconductor is generally utilized as the voltage-controlled resistor (402). Typically, the second adjustable amplifier (404) is at least one predetermined operational amplifier and a desired number of predetermined resistors, selected to provide a second desired amplified output signal.

A resultant generator (116) combines, typically by summing, the amplified output signal (G, H, . . . ) to provide a resultant signal as an output (118). Typically, at least two amplified output signals are combined.

FIG. 5, numeral 500, sets forth a flow diagram illustrating the steps of one embodiment of the method of the present invention. At least one receiver of a communication system having at least one receiver on each of at least first and second receiver branches receives at least a first (ALF) signal and determines at least a first (ALF) control value in view of the ALF received signal (502). An at least first (ALF) designated (DES) signal is determined (504), the ALF control value is utilized to amplify the ALF DES signal (506), and a resultant signal is generated (508) as set forth above.

The present invention provides an improved diversity reception utilizing minimal amounts of hardware, as described above.

We claim:

1. A method of providing improved diversity reception to a receiver system in a communication system, the receiver system having at least one receiver on each of at least first and second receiver branches, comprising at least the steps of:
    A) receiving at least a first signal on at least a first receiver branch and determining at least a first control voltage value utilizing the at least first received signal;
    B) determining at least a first designated signal from the at least first received signal;
    C) utilizing the at least first control voltage value for the at least first received signal to amplify the at least first designated signal, thereby obtaining at least a first amplified designated signal; and
    D) generating a resultant signal utilizing the at least first amplified designated signal.

2. The method of claim 1, wherein the step of receiving at least a first signal on at least a first receiver branch and determining at least a first control voltage value for the at least first received signal further comprises at least the steps of:
    determining at least a first received signal strength for the at least first received signal; and
    determining at least a first weighted difference utilizing the at least first received signal strength, wherein the at least first received signal strength substantially corresponds to at least a first decibel received signal strength value for the at least first received signal.

3. The method of claim 2, wherein the step of determining at least a first weighted difference utilizing at least a first received signal strength further comprises at least the steps of:
    buffering and amplifying the at least first received signal strength to obtain at least a first desired signal strength; and
    utilizing the at least first desired received signal strength to obtain at least a first control voltage value.

4. The method of claim 1, wherein the step of utilizing the at least first control voltage value for the at least first received signal to amplify the at least first designated signal, thereby obtaining at least a first amplified designated signal, further comprises at least a step of:
    utilizing the at least first control voltage value and at least a first linear approximator to provide at least a first amplification of at least the first received signal, wherein the at least first linear approximator comprises at least a first voltage-controlled resistor and at least a first adjustable amplifier, thereby obtaining the at least first amplified designated signal.

5. The method of claim 1, wherein the step of generating a resultant signal utilizing the at least first amplified designated signal further comprises a step of at least substantially summing and amplified designated signal, there being at least the first amplified designated signal, to obtain the resultant signal.

6. A method of providing improved diversity reception to a receiver system in a communication system, the receiver system having at least one receiver on each of at least first and second receiver branches, comprising at least the steps of:
    A) receiving at least a first signal, being a first received signal, on an at least first receiver branch and determining at least a first control voltage value utilizing the at least first received signal;
    B) determining at least a first designated signal from the at least first received signal;
    C) utilizing the at least first control voltage value and at least a first linear approximator to provide at least a first amplification of the at least first designated signal, wherein the at least first linear approximator comprises at least a first voltage-controlled resistor and at least a first adjustable amplifier, thereby obtaining at least a first amplified designated signal; and
    D) generating a resultant signal utilizing the at least first amplified designated signal.

7. The method of claim 6, wherein the step of receiving at least a first signal on an at least first receiver branch and determining at least a first control voltage value for an at least first received signal further comprises at least the steps of:
    determining at least a first received signal strength for the at least first received signal; and
    determining at least a first weighted difference utilizing the at least first received signal strength, wherein the at least first received signal strength substantially corresponds to at least a first decibel received signal strength value for the at least first received signal.

8. The method of claim 7, wherein the step of determining at least a first weighted difference utilizing at least a first received signal strength further comprises at least the steps of:
buffering and amplifying the at least first received signal strength to obtain at least a first desired signal strength; and
utilizing the at least first desired received signal strength to obtain at least a first control voltage value.

9. The method of claim 6, wherein the step of generating a resultant signal utilizing the at least first amplified designated signal further comprises a step of at least substantially summing any amplified designated signal, there being at least the first amplified designated signal, to obtain the resultant signal.

10. A method of providing improved diversity reception to a receiver system in a radio, the receiver system having at least one receiver on each of at least first and second receiver branches, comprising at least the steps of:
A) receiving at least a first signal, being a first received signal, on an at least first receiver branch and determining at least a first control voltage value utilizing the at least first received signal;
B) determining at least a first designated signal from the at least first received signal;
C) utilizing the at least first control voltage value for the at least first received signal to amplify the at least first designated signal, thereby obtaining at least a first amplified designated signal;
D) generating a resultant signal utilizing the at least first amplified designated signal.

11. The method of claim 10, wherein the step of receiving at least a first signal on at least a first receiver branch and determining at least a first control voltage value for an at least first received signal further comprises at least the steps of:
determining at least a first received signal strength for the at least first received signal; and
determining at least a first weighted difference utilizing the at least first received signal strength, wherein the at least first received signal strength substantially corresponds to at least a first decibel received signal strength value for the at least first received signal.

12. The method of claim 11, wherein the step of determining at least a first weighted difference utilizing at least a first received signal strength further comprises at least the steps of:
buffering and amplifying the at least first received signal strength to obtain at least a first desired signal strength; and
utilizing the at least first desired received signal strength to obtain at least a first control voltage value.

13. The method of claim 10, wherein the step of utilizing the at least first control voltage value for at least the first received signal to amplify the at least first designated signal, thereby obtaining at least a first amplified designated signal, further comprises at least a step of:
utilizing the at least a first control voltage value and at least a first substantially linear approximator to provide at least a first amplification of at least a first designated signal, wherein
the at least first substantially linear approximator comprises at least a first voltage-controlled resistor and at least a first adjustable amplifier, thereby obtaining the at least first amplified designated signal.

14. The method of claim 10, wherein the step of generating a resultant signal utilizing the at least first amplified designated signal further comprises a step of at least substantially summing any amplified designated signal, there being at least the first amplified designated signal, to obtain the resultant signal.

15. A device for providing improved diversity reception to a receiver system in a communication system, the receiver system having at least first and second receiver branches, comprising at least:
A) a first receiver on a first receiver branch and a second receiver on a second receiver branch, having at least a first received signal on each of the receiver branches;
B) a first weighted difference generator, responsive to the at least first receiver, for generating at least a first control voltage value utilizing at least the first received signal;
C) a first designator, responsive to the at least first receiver, for generating at least a first designated signal from at least the first received signal;
D) a first linear approximator, responsive to the at least first designator and the at least first weighted difference generator, for utilizing the at least first control voltage value for at least the first received signal to amplify the at least first designated signal, thereby obtaining at least a first amplified designated signal; and
E) a resultant generator, responsive to the at least first linear approximator, for generating a resultant signal utilizing the at least first amplified designated signal.

16. The device of claim 15, wherein the at least first weighted difference generator comprises at least:
a first magnitude determiner, responsive to the at least first receiver, for generating at least a first received signal strength for the at least first received signal;
a first buffer and a second amplifier, the at least first buffer and the at least first amplifier being responsive to the at least first receiver, for generating at least a first desired signal strength; and
a first control voltage determiner, responsive to the at least first receiver, for generating at least a first weighted difference utilizing at least a first received signal strength, the at least first weighted difference corresponding to at least a first control voltage value.

17. The device of claim 15, wherein the at least first linear approximator for utilizing the at least first control voltage value for at least the first received signal to amplify the at least first designated signal, thereby obtaining at least a first amplified designated signal, further comprises at least:
a first voltage-controlled resistor, responsive to the at least first weighted difference generator, for substantially determining at least a first variable resistance; and
a first adjustable amplifier, responsive to the at least first voltage-controlled resistor and the at least first designator, for utilizing the at least first variable resistance and the at least first designated signal to provide at least a first amplified designated signal.

18. The device of claim 15, wherein the resultant generator for generating a resultant signal utilizing the at least first amplified designated signal comprises at least a summer for substantially summing any amplified designated signal, there being at least the first amplified designated signal, to obtain the resultant signal.

19. A device for providing improved diversity reception to a receiver system in a communication system, the receiver system having at least first and second receiver branches, comprising at least:
   A) a first receiver on a first receiver branch and a second receiver on a second receiver branch, having at least a first received signal on each of the receiver branches;
   B) a first weighted difference generator, responsive to the at least first receiver, for generating at least a first control voltage value utilizing at least the first received signal;
   C) a first designator, responsive to the at least first receiver, for generating at least a first designated signal from at least the first received signal;
   D) a first linear approximator, responsive to the at least first designator and the at least first weighted difference generator, for utilizing the at least first control voltage value and at least a first designated signal to provide at least a first amplified designated signal, wherein the at least first linear approximator further comprises at least:
      a first voltage-controlled resistor, responsive to the at least first weighted difference generator, for generating at least a first variable resistance; and
      a first adjustable amplifier, responsive to the at least first voltage-controlled resistor and the at least first designator, for utilizing the at least first variable resistance and the at least first designated signal to provide at least a first amplified designated signal; and
   E) a resultant generator, responsive to the at least first linear approximator, for generating a resultant signal utilizing the at least first amplified designated signal.

20. The device of claim 19, wherein the at least first weighted difference generator comprises at least:
   a first magnitude determiner, responsive to the at least first receiver, for generating at least a first received signal strength for the at least first received signal;
   a first buffer and a second amplifier the at least first buffer and the at least second amplifier being responsive to the at least first receiver, for generating at least a first signal strength; and
   a first control voltage determiner, responsive to the at least first receiver, for generating at least a first weighted difference utilizing at least a first received signal strength, the at least first weighted difference corresponding to at least a first control voltage value.

21. The device of claim 19, wherein the resultant generator for generating a resultant signal utilizing the at least first amplified designated signal comprises at least a summer for substantially summing any amplified designated signal, there being at least the first amplified designated signal, to obtain the resultant signal.

22. A device for providing improved diversity reception to a receiver system in a radio, the receiver system having at least first and second receiver branches, comprising at least:
   A) a first receiver on a first receiver branch and a second receiver on a second receiver branch, having at least a first received signal on at least a first-/second receiver branch;
   B) a first weighted difference generator, responsive to the at least first receiver, for generating at least a first control voltage value utilizing at least the first received signal;
   C) a first designator, responsive to the at least first receiver, for generating at least a first designated signal from at least the first received signal;
   D) a first linear approximator, responsive to the at least first designator and the at least first weighted difference generator, for utilizing the at least first control voltage value for at least the first received signal to amplify the at least first designated signal, thereby obtaining at least a first amplified designated signal; and
   E) a resultant generator, responsive to the at least first linear approximator, for generating a resultant signal utilizing the at least first amplified designated signal.

23. The device of claim 22, wherein the at least first weighted difference generator comprises at least:
   a first magnitude determiner, responsive to the at least first receiver, for generating at least a first received signal strength for the at least first received signal;
   a first buffer and a second amplifier, the at least first buffer and the at least first amplifier being responsive to the at least first receiver, for generating at least a first signal strength; and
   a first control voltage determiner, responsive to the at least first receiver, for generating at least a first weighted difference utilizing at least a first received signal strength, the at least first weighted difference corresponding to at least a first control voltage value.

24. The device of claim 22, wherein the at least first linear approximator for utilizing the at least first control voltage value for at least the first received signal to amplify the at least first designated signal, thereby obtaining at least a first amplified designated signal, further comprises at least:
   a first voltage-controlled resistor, responsive to the at least first weighted difference generator, for substantially determining at least a first variable resistance; and
   a first adjustable amplifier, responsive to the at least first voltage-controlled resistor and the at least first designator, for utilizing the at least first variable resistance and the at least first designated signal to provide at least a first amplified designated signal.

25. The device of claim 22, wherein the resultant generator for generating a resultant signal utilizing the at least first amplified designated signal comprises at least a summer for substantially summing any amplified designated signal, there being at least the first amplified designated signal, to obtain the resultant signal.

* * * * *

UNITED STATES PATENT AND TRADEMARK OFFICE
CERTIFICATE OF CORRECTION

PATENT NO. : 5,239,698

DATED : August 24, 1993

INVENTOR(S) : James Dejmek and Michael K. Alwine

It is certified that error appears in the above-identified patent and that said Letters Patent is hereby corrected as shown below:

In the Claims:

At column 4, line 30, "and" should be --any--.

At column 5, line 29, insert after "signal;" --and--.

Signed and Sealed this

Twenty-second Day of March, 1994

*Attest:*

BRUCE LEHMAN

*Attesting Officer*   *Commissioner of Patents and Trademarks*